United States Patent
Masahiro et al.

(10) Patent No.: US 8,728,351 B2
(45) Date of Patent: May 20, 2014

(54) CONDUCTIVE POLYMER SOLUTION, CONDUCTIVE COATING FILM AND INPUT DEVICE

(75) Inventors: Yasushi Masahiro, Saitama (JP); Toshihide Sakuta, Saitama (JP); Kazuyoshi Yoshida, Kazo (JP)

(73) Assignee: Shin-Etsu Polymer Co., Ltd. (JP)

( * ) Notice: Subject to any disclaimer, the term of this patent is extended or adjusted under 35 U.S.C. 154(b) by 268 days.

(21) Appl. No.: 13/119,770

(22) PCT Filed: Sep. 18, 2009

(86) PCT No.: PCT/JP2009/004730
§ 371 (c)(1),
(2), (4) Date: Mar. 18, 2011

(87) PCT Pub. No.: WO2010/032480
PCT Pub. Date: Mar. 25, 2010

(65) Prior Publication Data
US 2011/0175036 A1    Jul. 21, 2011

(30) Foreign Application Priority Data
Sep. 22, 2008 (JP) .............................. P2008-242792

(51) Int. Cl.
*H01B 1/12* (2006.01)
*C08L 101/12* (2006.01)
(52) U.S. Cl.
USPC ......................................... 252/500; 345/173
(58) Field of Classification Search
CPC   H01B 1/127; H01L 51/0037; H01L 51/0073; C09D 165/00; C08L 101/12; C08J 7/04; C08K 5/09; C08K 5/1525

USPC .......................................... 252/500; 345/173
See application file for complete search history.

(56) References Cited

U.S. PATENT DOCUMENTS

| 7,554,793 | B2 * | 6/2009 | Chacko ......................... 361/525 |
| 7,842,196 | B2 * | 11/2010 | Yoshida et al. ................ 252/500 |
| 2007/0290194 | A1 * | 12/2007 | Becker et al. ................... 257/40 |
| 2009/0294735 | A1 * | 12/2009 | Yoshida et al. ................ 252/500 |

FOREIGN PATENT DOCUMENTS

| JP | 2005-146259 | 6/2005 |
| JP | 2005-314671 | 11/2005 |
| JP | 2005-350622 | 12/2005 |
| JP | 2006-328276 | 12/2006 |

(Continued)

OTHER PUBLICATIONS

English translation of JP 2005-314671.*

(Continued)

*Primary Examiner* — Mark Kopec
(74) *Attorney, Agent, or Firm* — Ostrolenk Faber LLP

(57) ABSTRACT

The present invention provides a conductive polymer solution capable of forming a conductive coating film having both superior preservation stability and water resistance. The conductive polymer solution of the present invention includes a π-conjugated conductive polymer, a polyanion, a compound having oxetane ring and a solvent; wherein, the amount of the compound having oxetane ring is within the range of 1 to 500% by mass based on a value of 100% by mass for the total amount of then-conjugated conductive polymer and the polyanion.

10 Claims, 2 Drawing Sheets

(56) References Cited

FOREIGN PATENT DOCUMENTS

| | | |
|---|---|---|
| JP | 2007-204704 | 8/2007 |
| JP | 2007-246708 | 9/2007 |
| JP | 2007-308691 | 11/2007 |
| JP | 2008-031204 | 2/2008 |
| JP | 2008-045061 | 2/2008 |
| JP | 2008-063485 | 3/2008 |
| TW | 200624504 | 7/2006 |
| WO | WO 2007/037292 A1 | 4/2007 |
| WO | WO 2007/091656 A1 | 8/2007 |

OTHER PUBLICATIONS

Office Action dated Oct. 31, 2012 issued in corresponding Taiwanese Patent Application No. 098131480 with English translation (9 pages).

International Search Report and Written Opinion mailed Jan. 12, 2010 in corresponding PCT International Application No. PCT/JP2009/004730.

Chinese Office Action, dated Mar. 13, 2013, issued in corresponding Chinese Patent Application No. 200980136692.X Total 14 pages, including English Translation.

\* cited by examiner

CONDUCTIVE POLYMER SOLUTION, CONDUCTIVE COATING FILM AND INPUT DEVICE

CROSS-REFERENCE TO RELATED APPLICATIONS

The present application is a 35 U.S.C. §§371 national phase conversion of PCT/JP2009/004730, filed Sep. 18, 2009, which claims priority of Japanese Patent Application No. 2008-242792, filed Sep. 22, 2008, the contents of which are incorporated herein by reference. The PCT International Application was published in the Japanese language.

TECHNICAL FIELD

The present invention relates to a conductive polymer solution and a conductive coating film having a $\pi$-conjugated conductive polymer. Moreover, the present invention also relates to an input device such as a touch panel.

BACKGROUND ART

Touch panels are input devices installed on image display devices in which at least a portion thereof that overlaps with the image display device is transparent.

A known example of a touch panel is a resistive film type touch panel. In a resistive film type touch panel, a stationary electrode sheet and a movable electrode sheet, in which a transparent conductive coating film is formed on one side of a transparent base, are arranged so that the transparent conductive coating film are mutually opposed. An indium-doped tin oxide film (to be referred to as an ITO film) has widely been used for the transparent conductive coating film of these electrode sheets.

A sheet in which an ITO film is formed on one side of a transparent base (to be referred to as a ITO film forming sheet) has low flexibility and is easily immobilized, thereby making it preferable for use as a stationary electrode sheet of an image display device. However, in the case of using as a movable electrode sheet on the side of an input operator of a touch panel, it had the problem of low durability during repeated deflection.

Therefore, a flexible sheet in which is formed a transparent conductive coating film containing $\pi$-conjugated conductive polymer (to be referred to as a conductive polymer film forming sheet) is used on one side of a transparent base as a movable electrode sheet on the side of an input operator of a touch panel.

As a conductive polymer film forming sheet, Patent Document 1, for example, discloses a conductive polymer film forming sheet having a transparent conductive coating film formed from a composition containing a $\pi$-conjugated conductive polymer and a water-soluble epoxy on a transparent base.

However, the composition disclosed in Patent Document 1 has problems such that the composition is low in preservation stability and a coating film obtained from the composition is low in water resistance.

PRIOR ART

[Patent Document 1] Japanese Laid-Open Patent Application No. 2005-146259

DISCLOSURE OF THE INVENTION

Problems to be Solved by the Invention

With the foregoing in view, an object of the present invention is to provide a conductive polymer solution capable of forming a conductive coating film having both superior preservation stability and water resistance. In addition, an object of the present invention is to provide an input device which is excellent in water resistance.

Means for Solving the Problems

[1] A conductive polymer solution, comprising: $\pi$-conjugated conductive polymer, a polyanion, a compound having oxetane ring and a solvent; wherein, the amount of the compound having oxetane ring is within the range of 1 to 500% by mass based on a value of 100% by mass for the total amount of the $\pi$-conjugated conductive polymer and the polyanion.

[2] The conductive polymer solution described in [1] above, containing a compound having a carboxy group.

[3] The conductive polymer solution described in [1] or [2] above, containing a cation forming compound which generates Lewis acid.

[4] The conductive polymer solution described in any one of [1] to [3] above, contains a conductive compound.

[5] The conductive polymer solution described in any one of [1] to [4] above, containing at least one type of highly conductive agents selected from the group consisting of an aromatic ring compound having nitrogen, a compound having two or more of hydroxy group, a compound having two or more of carboxy group, a compound having one or more of hydroxy group and one or more of carboxy group, a compound having amide group, a compound having imide group, lactam compound, a compound having glycidyl group, a silane coupling agent and water-soluble organic solvent.

[6] A conductive coating film, which is formed by coating the conductive polymer solution described in any of [1] to [5] above.

[7] An input device having the conductive coating film described in [6] above.

Effects of the Invention

A conductive polymer solution of the present invention has high preservation stability, and enables forming of a highly water resistant conductive coating film.

An input device of the present invention is excellent in water resistance.

BEST MODE FOR CARRYING OUT THE INVENTION

<Conductive Polymer Solution>

Figure 1:
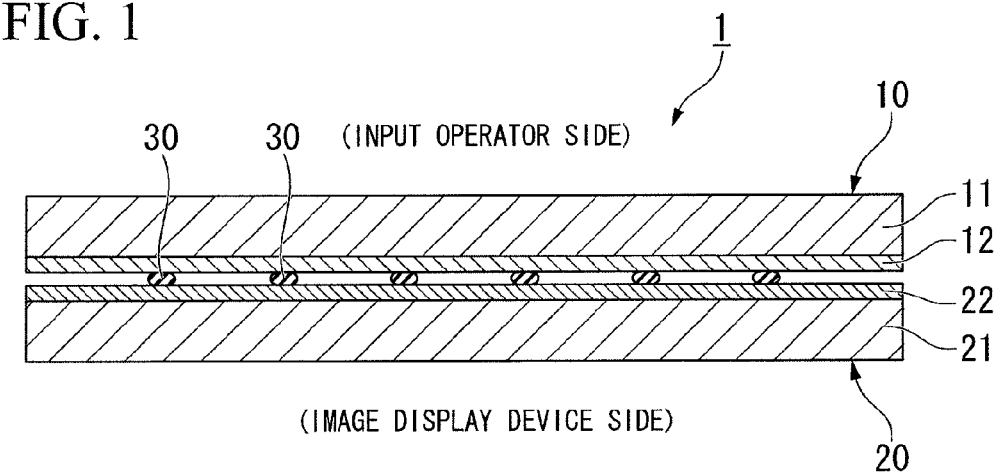
FIG. 1 is a cross-sectional view showing an example of an input device of the present invention.

The conductive polymer solution of the present invention contains a π-conjugated conductive polymer, a polyanion, a compound having an oxetane ring (to be referred to as an oxetane compound) and a solvent.

(π-Conjugated Conductive Polymers)

There are no particular limitations on the π-conjugated conductive polymer provided it is an organic polymer in which the main chain is composed of a π-conjugated system, examples of which include polypyrroles, polythiophenes, polyacetylenes, polyphenylenes, polyphenylenevinylenes, polyanilines, polyacenes, polythiophenevinylenes and copolymers thereof. In consideration of stability in air, polypyrroles, polythiophenes and polyanilines are preferable.

Although the π-conjugated conductive polymer allows the obtaining of adequate electrical conductivity and compatibility with binder resin even if allowed to remain unsubstituted, in order to further enhance electrical conductivity and compatibility, a functional group such as an alkyl group, carboxy group, sulfo group, alkoxy group or hydroxy group is preferably introduced into the π-conjugated conductive polymer.

Specific examples of π-conjugated conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecylthiophene), poly(3-methyl-4-methoxythiophene), poly(3,4-ethylenedioxythiophene), (poly-3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid) and poly(3-anilinesulfonic acid). Among these, poly(3,4-ethylenedioxythiophene) is preferable in terms of electrical conductivity and heat resistance.

(Polyanions)

Examples of polyanions include optionally substituted polyalkylenes, optionally substituted polyalkenylenes, optionally substituted polyimides, optionally substituted polyamides and optionally substituted polyesters, which are polymers that are composed only of constituent units having an anionic group or polymers composed of constituent units having an anionic group and constituent units not having an anionic group.

Polyalkylenes refer to polymers in which the main chain is composed of repeating methylene groups.

Polyalkenylenes refer to polymers composed of constituent units in which a single unsaturated double bond (vinyl group) is contained in the main chain.

Examples of polyimides include polyimides composed of acid anhydrides such as pyromellitic dianhydride, biphenyltetracarboxylic dianhydride or benzophenonetetracarboxylic dianhydride, 2,2'-[4,4'-di(dicarboxyphenyloxy)phenyl]propane dianhydride, and diamines such as oxydiamine, paraphenylenediamine, metaphenylenediamine or benzophenonediamine.

Examples of polyamides include polyamide 6, polyamide 6,6 and polyamide 6,10.

Examples of polyesters include polyethylene terephthalate and polybutylene terephthalate.

In the case the polyanion has a substituent, examples of the substituent include an alkyl group, hydroxy group, amino group, carboxy group, cyano group, phenyl group, phenol group, ester group, alkoxy group and the like. An alkyl group, hydroxy group, phenol group or ester group is preferable in consideration of solubility in organic solvent, heat resistance and resin compatibility.

Examples of alkyl groups include alkyl groups such as a methyl, ethyl, propyl, butyl, isobutyl, t-butyl, pentyl, hexyl, octyl, decyl or dodecyl group, and cycloalkyl groups such as a cyclopropyl, cyclopentyl or cyclohexyl group.

Examples of hydroxy groups include hydroxy groups bound to the main chain of the polyanion either directly or through another functional group, and examples of other functional groups include alkyl groups having 1 to 7 carbon atoms, alkenyl groups having 2 to 7 carbon atoms, amide groups and imide groups. The hydroxy group is substituted either on the terminal of or within these functional groups.

Examples of amino groups include amino groups bound to the main chain of the polyanion either directly or through another functional group, and examples of other functional groups include alkyl groups having 1 to 7 carbon atoms, alkenyl groups having 2 to 7 carbon atoms, amide groups and imide groups. The amino group is substituted either on the terminal of or within these functional groups.

Examples of phenol groups include phenol groups bound to the main chain of the polyanion either directly or through another functional group, and examples of other functional groups include alkyl groups having 1 to 7 carbon atoms, alkenyl groups having 2 to 7 carbon atoms, amide groups and imide groups. The phenol group is substituted either on the terminal of or within these functional groups.

Examples of polyalkylenes having a substituent include polyethylene, polypropylene, polybutene, polypentene, polyhexene, polyvinyl alcohol, polyvinyl phenol, poly(3,3,3-trifluoropropylene), polyacrylonitrile, polyacrylate, polystyrene and the like.

Specific examples of polyalkenylenes include polymers containing one or more types of constituent units selected from the group consisting of propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, hexenylene and the like.

Examples of anionic groups of the polyanion include —O—$SO_3^-X^+$, —$SO_3^-X^+$ and —$COO^-X^+$ (wherein, $X^+$ in each formula represents a hydrogen ion or alkaline metal ion).

Namely, the polyanion is polymeric acid that contains a sulfo group and/or carboxy group. Among these, —$SO_3^-X^+$ and —$COO^-X^+$ are preferable from the viewpoint of doping effects on the π-conjugated conductive polymer.

In addition, these anionic groups are preferably arranged in the main chain of the polyanion either mutually adjacent or at fixed intervals.

Among the aforementioned polyanions, polyisoprene sulfonic acid, copolymers containing polyisoprene sulfonic acid, polypolysulfoethylmethacrylate, copolymers containing polypolysulfoethylmethacrylate, poly(4-sulfobutyl-methacrylate), copolymers containing poly(4-sulfobutyl-methacrylate), polymethacryl oxybenzene sulfonic acid, copolymers containing polymethacryl oxybenzene sulfonic acid, polystryene sulfonic acid, copolymers containing polystyrene sulfonic acid and the like.

The degree of polymerization of the polyanion is preferably within the range of 10 to 100,000 monomer units, and more preferably within the range of 50 to 10,000 monomer units from the viewpoints of solvent solubility and electrical conductivity.

The amount of the polyanion is preferably within the range of 0.1 to 10 mol, and more preferably within the range of 1 to 7 mol, based on 1 mole of the π-conjugated conductive polymer. If the amount of polyanion is less than 0.1 mol, doping effects on the π-conjugated conductive polymer tend to weaken resulting in inadequate electrical conductivity. Moreover, dispersibility and solubility of polyanion in a solvent also lowers making it difficult to obtain a homogeneous dispersion. In addition, if the amount of polyanion exceeds 10 mol, the amount of the π-conjugated conductive polymer decreases, again making it difficult to obtain adequate electrical conductivity.

The polyanion is coordinated by the π-conjugated conductive polymer. Consequently, the π-conjugated conductive polymer and the polyanion form a complex.

The total amount of the π-conjugated conductive polymer and the polyanion in the conductive polymer solution is 0.05 to 5.0% by mass and preferably 0.1 to 4.0% by mass. If the total amount of the π-conjugated conductive polymer and the polyanion is less than 0.05% by mass, adequate electrical conductivity may be unable to be obtained, while if the total amount exceeds 5.0% by mass, a uniform conductive coating film may be unable to be obtained.

(Oxetane Compounds)

Specific examples of oxetane compounds include compounds having oxetane ring of 2 functional compounds such as xylenebisoxetane, 3-ethyl-3{[(3-ethyloxetane-3-yl)methoxy]methyl}oxetane, 4,4'-(3-ethyloxetane-3-ylmethyloxymethyl)biphenyl, 1,4-bis{[(3-ethyl-3-oxetanyl)methoxy]methyl}benzene, di{1-ethyl(3-oxetanyl)}methyl ether, 1,6-bis{(3-ethyl-3-oxetanyl)methoxy}hexane, 9,9-bis{2-methyl-4-[2-(3-oxetanyl)]butoxyphenyl}fluorene, 9,9-bis{4-{2-[2-(3-oxetanyl)]butoxy}ethoxyphenyl}fluorine and the like; multifunctional oxetane compounds such as oxetane novolac resin and the like; compounds having oxetane ring of 1 functional compounds such as 3-ethyl-3-(hydroxymethyl)oxetane, 3-ethyl-3-(2-ethylhexoxymethyl)oxetane, 3-ethyl-3-phenoxymethyloxetane, 3-(methacryloyloxymethyl)oxetane, 3-(methacryloyloxymethyl)-2-phenyloxeatane and the like.

The amount of oxetane compounds is 1 to 500% by mass and preferably 10 to 400% by mass based on a value of 100% by mass for the total amount of π-conjugated conductive polymer and polyanion. When the amount of oxetane compounds is less than 1% by mass, water resistance of a conductive coating film obtained from a conductive polymer solution may be poor. When the amount of oxetane compounds exceeds 500% by mass, the amount of a π-conjugated conductive polymer in the conductive coating film obtained from the conductive polymer solution becomes less and adequate conductivity cannot be obtained.

(Hardening Agent for Oxetane Compounds)

It is preferable to include a hardening agent for oxetane compounds into a conductive polymer solution since the water resistance of the conductive coating film obtained from the conductive polymer solution becomes superior.

Examples of hardening agents for oxetane compounds includes amine hardening agent, acids or acid anhydride hardening agent, basic active hydrogen compounds, imidazole, polymercaptane hardening agent, isocyanate hardening agent and the like.

Examples of amine hardening agents includes aliphatic polyamines such as ethylenediamine, diethylenetriamine, triethylenetetramine and the like; alicyclic polyamines such as isophorone diamine, 1,3-bisaminomethylcyclohexane and the like; aromatic polyamines such as diaminodiphenylmethane, diaminodiphenyl sulfone and the like; secondary amines or tertiary amines such as linear diamine, tetramethylguanidine, triethanolamine, piperidine, pyridine, benzyldimethylamine and the like; polyamidoamines that are obtained from reacting dimer acid and polyamines such as diethylenetriamie, triethylenetetramine and the like.

Examples of acids or acid anhydride hardening agents include polycarboxylic acids such as adipic acid, azelaic acid, trimellitate, pyromellitic acid, decanedicarboxylic acid and the like; aromatic anyhydrides such as phthalic anhydride, trimellitic anhydride, pyromellitic anhydride, 3,3'4,4'-benzophenonetetracarboxylic acid anhydride and the like; cyclic fatty acids anhydrides such as maleic anhydride, succinic anhydride, tetrahydrophthalic anhydride, methyltetrahydrophthalic anhydride and the like; fatty acids anhydrides such as polyadipic acid anhydride, polyazelaic acid anhydride, polysebacic anhydride, dodesenyl anhydride succinic acid, poly(ethyl)octadecanedioic acid anhydride and the like.

Examples of active hydrogen compounds include organic acid dihydrazide and the like.

Examples of imidazole include 2-methyl imidazole, 2-ethyl-4-methylimidazole, 2-heptanedecylimidazole, and the like.

Examples of polymercaptane hardening agents include ethers for examples, thioglycolic acid such as pentaerythritoltetrathioglycolate, dipentaerythritolhexathioglycolate and the like.

Examples of isocyanate hardening agents include isocyanate compounds such as hexamethylene diisocyanate, xylene diisocyanate; block-isocyanate compound which is produced by reacting isocyanate group with phenol, alcohol, caprolactone and the like.

The amount of hardening agent for oxetane compounds is preferably 0.1 to 1000% by mass and more preferably 1 to 800% by mass based on a value of 100% by mass for the oxetane compound. When the total amount of hardening agents for oxetane compound is equal to or more than 0.1% by mass, oxetane compounds can be adequately hardened. When the total amount of hardening agents for oxetane compound is equal to or less than 1000% by mass, the characteristics of oxetane resin for a conductive coating film formed from a conductive polymer solution can be sufficiently expressed.

(Cation Forming Compounds)

A conductive polymer solution is preferably contain a cation forming compound from the view point of hardening oxetane compound promptly and fully.

A cation forming compound is a compound to generate a Lewis acid. Examples of cation forming compounds include photo cationic initiator, thermal cationic initiator and the like. Photo cationic initiator and thermo cationic initiator may be used in combination.

Examples of photo cationic initiator includes diazonium salt of Lewis acid; iodonium acid of Lewis acid; sulfonium salt of Lewis acid and the like. These photo cationic initiators consist of onium salt. Cation of the onium salt includes aromatic diazonium, aromatic iodonium, aromatic sulfonium and the like. Anion of the onium salt includes sulfur tetrafluoride ($BF^{4-}$), hexafluorophosphate($PF^{6-}$), antimony hexafluoride($SbF^{6-}$), $[BX^4]^-$ (Note, X represents phenyl group which is substituted with at least two fluorine or trifluoromethyl groups) or the like.

Examples of onium salts include phenyldiazonium sulfurtetrafluoride, diphenyliodonium hexafluorophosphate, diphenyliodonium antimonyhexafluoride, tri-4-methylphenylsulfonium arsenichexafluoride, tri-4-methylphenylsulfonium antimonytetrafluoride, diphenyliodonium tetrakis(pentafluorophenyl)boron, a mixture of acetylaceton aluminum salt and orthonitro benzylsilylether, phenylthiopyridinium salt, phosphorous allene hexafluoride-ferric complex and the like.

Examples of commercially available photo cationic initiators include CD-1012(manufactured by Sartomer Company Inc.), PCI-019, PCI-021 (manufactured by Nippon Kayaku Co., Ltd.), OPTOMER SP-150, OPTOMER SP-170 (manufactured by ADEKA Corp.), UVI-6990 (manufactured by The Daw Chemical Company), CPI-100P, CPI-100A (manufactured by San-Apro Ltd.), TEPBI-S (manufactured by Nippon Shokubai Co., Ltd.), WPI-031, WPI-054, WPI-113, WPI-116, WPI-170 (manufactured by Wako Pure Chemical Industries, Ltd.), IRGACURE250 (manufactured by Chiba Speciality Chemicals) and the like.

One type of photo cationic initiator may be used alone or two or more types may be used in combination.

Among photo cationic initiators, the preferable anion is hexafluorophosphate and the preferable cation is sulfonium salt in consideration of stability and hardenability.

Examples of thermo cationic initiators include adekaoputon CP-66, CP-77 (manufactured by ADEKA Corp.) Sanaid SI-60L, SI-80L, SI-100L, SI-110L, SI-180L (manufactured by Sanshin Chemical Industry Co., Ltd.), CI-2920, CI-2921, CI-2946, CI-2639, CI-2624, CI-2064 (manufactured by Nippon Soda Co., Ltd.), FC-520 (manufactured by 3M) and the like.

One type of thermo cationic initiator may be used alone or two or more types may be used in combination.

The amount of cation forming agent is preferably 0.1 to 1000% by mass and more preferably 1 to 800% by mass based on a value of 100% by mass for the oxetane compound. When the amount of the cation forming agent is equal to or more than 0.1% by mass, oxetane compounds can be adequately hardened. However, the amount of the cation forming agent exceeds 1000% by mass, the cation forming agent becomes saturated, and the effect brought by the saturated cation forming agent becomes ineffective.

(Conductive Compounds)

A conductive polymer solution preferably includes a conductive compound since the conductive polymer solution is capable of reducing the contact resistivity to mutually different conductors such as ITO and the like.

Examples of conductive compounds include metal particles, silver halide, carbon, and conductive metal oxide. In addition, when a reducing agent is added in the conductive compound, metal ions are also treated as a conductive compound. This is because the metal ion forms metal particles by a reducing agent when forming a conductive coating film.

[Metal Particles]

The metals that form the metal particles in the present invention are, for examples, copper, silver, palladium, nickel, aluminum, gold, platinum, indium, lead, iron, cobalt, zinc, tin, gallium and the like. One type of metal may be used alone or two or more types may be used in combination.

The mean particle diameter of the metal particle (metal nano particles) may be equal to or more than 1 nm to less than 100 nm particles. The mean particle diameter of the normal metal particles may be equal to or more than 100 nm to less than or equal to 100 μm particles.

When metal particles are metal nano particles, more than one type of metals selected from the group consisting of silver, gold, nickel, copper, platinum, palladium or indium are suitable for metals.

If the mean particle diameter of metal particles is less than 1 nm, preparation of the metal particles may be difficult, while if the mean particle diameter of metal particles exceeds 10 μm, the dispersibility of the metal particles in a conductive polymer solution tends to be reduced.

The amount of the metal particles is preferably equal to or more than 0.01% by mass to less than 5.0% by mass and more preferably 0.05% by mass to 4.0% by mass, based on a value of 100% by mass for the total amount of the π-conjugated conductive polymer and the polyanion. If the amount of the metal particles is less than 0.01% by mass, a malfunction may occur as a result of failing to sufficiently lower contact resistance during contact of mutually different conductors, while if the amount of the metal ion is equal to or more than 5.0% by mass, the transparency of a conductive coating film formed from the conductive polymer solution may decrease.

(Silver Halides)

Examples of the silver halide include silver bromide, silver chloride, silver iodide and silver fluoride. One type of these silver halides may be used alone or two or more types may be used in combination.

Among these silver halides, silver bromide, silver chloride and silver iodide are preferable in consideration of the cost, reactivity and oxidizing power of the halogen compound formed when reduced.

The amount of the silver that composes the silver halide is preferably 0.001 to 50% by mass, more preferably 0.005 to 40% by mass and most preferably 0.01 to 30% by mass based on a value of 100% by mass for the total amount of the π-conjugated conductive polymer and the polyanion. If the amount of silver that composes the silver halide is less than 0.001% by mass, a malfunction may occur as a result of failing to sufficiently lower contact resistance during contact of mutually different conductors, while if the silver amount exceeds 50% by mass, the transparency of a conductive coating film formed from the conductive polymer solution may decrease.

(Carbons)

Examples of carbons include carbon blacks such as furnace black, acetylene black and channel black, and furnace black is preferable from the viewpoint of electrical conductivity.

In addition, since carbon black improves the dispersibility in water, the carbon black is preferably hydrophilized by having carboxy groups on the surface thereof.

Since carbon black has a carbon framework, it demonstrates superior stability in environments with high temperature and humidity levels. In addition, since it also demonstrates superior absorption of ultraviolet rays, ultraviolet deterioration can be prevented by containing carbon black in a coating film.

The mean particle diameter of the carbon black is preferably 0.01 to 0.5 μm. Handling ease is superior if the mean particle diameter of the carbon black is 0.01 μm or more, while the dispersibility in the carbon black can be easily enhanced if the mean particle diameter is 0.5 μm or less.

Examples of carbon nanotubes include single layer carbon nanotube, multi layer carbon nanotube wherein carbon nanotubes in a plurality of layers are accumulated in a concentric fashion or in a coil fashion, carbon nanohorn wherein one end of the carbon nanotube is closed, the carbon nanotube which is cup-shaped or the like. Among these carbon nanotubes, single layer carbon nanotubes are preferable.

When carbon nanotube is added to a conductive polymer solution, surfactant is also preferably added in order to improve the dispersibility of carbon nanotubes. Example of a surfactant, dodecylbenzenesulfonic acid sodium salt is preferably used in consideration of the excellent dispersibility of carbon nanotube.

Examples of production methods of carbon nanotubes include catalytic hydrogenation and reduction of carbon dioxide, arc discharge, laser vaporization, chemical vaporization, vapor deposition, high-pressure carbon monoxide (HiPco) processes which synthesize carbon nanotubes by growing carbon monoxide in gas-phase under high temperature and high pressure with iron catalysts.

In addition, carbon nanotube is preferably highly purified by purification from the viewpoint of conductivity. Examples of purification methods include washing method, centrifugation method, filtering method, oxidation method, chromatographic method and the like.

The amount of carbon is 0.01 to 10% by mass, preferably 0.01 to 8.0% by mass and most preferably 0.01 to 5.0% by mass based on a value of 100% by mass for the total amount of the π-conjugated conductive polymer and the polyanion. If the amount of the carbon is less than 0.01% by mass, a malfunction may occur as a result of failing to sufficiently lower contact resistance during contact of mutually different conductors, while if the silver amount exceeds 10% by mass, the transparency of a conductive coating film formed from the conductive polymer solution may decrease.

(Conductive Metal Oxide Particles)

Examples of components of the conductive metal oxide particles include tin oxide, tin oxides doped with one or more elements selected from the group consisting of antimony, zinc and fluorine, indium oxide, indium oxides doped with one or more elements selected from the group consisting of tin, zinc, tellurium, silver, gallium, zirconium, hafnium and magnesium, antimony pentoxide, zinc oxide and zinc oxide doped with one or more elements selected from the group consisting of aluminum, gallium, indium, boron, fluorine and manganese.

Among these conductive metal oxide particles, one or more types of metal oxides selected from the group consisting of tin oxide, indium oxide, antimony pentoxide and zinc oxide are preferable since they are capable of easily improving the electrical conductivity.

The mean particle diameter of the conductive metal oxide particles is preferably 0.01 to 20 μm. Handling ease is superior if the mean particle diameter of the conductive metal oxide particles is 0.01 μm or more, while the dispersibility in the conductive metal oxide particles can be easily enhanced if the mean particle diameter is 20 μm or less.

The amount of the conductive metal oxide particles is preferably 0.01 to 50% by mass, more preferably 0.02 to 40% by mass and most preferably 0.05 to 30% by mass based on a value of 100% by mass for the total amount of the π-conjugated conductive polymer and the polyanion. If the amount of the conductive metal oxide particles is less than 0.01% by mass, a malfunction may occur as a result of failing to sufficiently lower contact resistance during contact of mutually different conductors, while if the amount exceeds 50% by mass, the transparency of a conductive coating film formed from the conductive polymer solution may decrease.

(Metal Ions)

The metals that form the metal ions in the present invention are one or more types of metals selected from the group consisting of nickel, copper, silver, gold, platinum and palladium.

Metal ions are formed by, for example, dissolving a metal salt in water.

Here, examples of metal salts include, silver nitrate, silver sulfate, silver acetate, silver nitrite, silver sulfite, silver chlorate, silver perchlorate, silver p-toluenesulfonate, silver 2-methylhexanoate, silver lactate, silver methanesulfonate, silver salicylate, silver behenate, silver stearate, silver oleate, silver laurate, silver capronate, silver myristate, silver palmitate, silver maleate, silver fumarate, silver tartrate, silver valerate, silver furoate, silver linoleate, silver butyrate, silver camphorate, silver benzoate, silver 3,5-dihydrobenzoate, silver o-methylbenzoate, silver m-methylbenzoate, silver p-methylbenzoate, silver 2,4-dichlorobenzoate, silver acetoamidobenzoate, silver p-phenylbenzoate, silver gallate, silver tannate, silver phthalate, silver terephthalate, silver phenylacetate, silver pyromellitate, silver picrate and silver salts of 3-carboxymethyl-4-methyl-4-thiazoline-2-thione; chloroauric acid, potassium chloroaurate and sodium chloroaurate; chloroplatinic acid, platinum chloride and potassium chloroplatinate; palladium nitrate, palladium acetate, palladium chloride and palladium sulfate; copper chloride, copper acetate and copper sulfate; and, nickel chloride, nickel nitrate, nickel perchlorate, nickel sulfate, nickel phosphate, nickel acetate, nickel lactate, nickel oxalate, nickel tartrate and nickel citrate. One type of these metal salts may be used alone or two or more types may be used in combination. Among these metal salts, silver nitrate, silver sulfate, silver acetate or silver p-toluenesulfonate and the like are preferable in consideration of cost and reactivity.

The amount of the metal ions is 0.001 to 50% by mass, preferably 0.005 to 40% by mass, and most preferably 0.01 to 30% by mass, based on a value of 100% by mass for the total amount of the π-conjugated conductive polymer and the polyanion. If the amount of the metal ions is less than 0.001% by mass, a malfunction may occur as a result of failing to sufficiently lower contact resistance during contact of mutually different conductors, while if the amount of metal ion exceeds 50% by mass, the transparency of a conductive coating film formed from the conductive polymer solution may decrease.

(Reducing Agents)

The reducing agent is a chemical that reduces the aforementioned metal ions to metal.

There are no particular limitations on the reducing agent, and examples include amine compounds (such as dimethylaminoethanol, methyldiethanolamine, triethanolamine, phenidone or hydrazine), hydrogen compounds (such as sodium borohydride, lithium borohydride, hydrogen iodide or hydrogen gas), oxides (such as carbon monoxide or sulfur dioxide), low atomic number metal salts (such as ferrous sulfate, iron oxide, iron fumarate, iron lactate, iron oxalate, iron sulfide, tin acetate, tin chloride, tin diphosphate, tin oxalate, tin oxide or tin sulfate), phenol-based compounds (such as hydroquinone, pyrogallol, tannin or tannic acid), sugars (such as D-glucose), vitamins (such as ascorbic acid), hydroxy-based compounds (such as glycol), benzotriazole-based compounds (such as 2-(2'-dihydroxy-4'-m-octoxyphenylbenzotriazole), benzophenone-based compounds (such as 2,2'-dihydroxybenzophenone, 2,4-dihydroxybenzophenone, 2,4'-dihydroxybenzophenone, 4,4'-dihydroxybenzophenone, 2,4,4'-trihydroxybenzophenone, 3,4,5-trihydroxybenzophenone, 2,3,4-trihydroxybenzophenone, 2,3,4,4'-tetrahydroxybenzophenone, 2,3',4,4'-tetrahydroxybenzophenone, 2,2'-dihydroxy-4-methoxy-benzophenone, 2,3,3',4,4',5'-hexahydroxybenzophenone, 2-hydroxybenzophenone, 4-hydroxybenzophenone, 2-hydroxyacetophenone, 4-hydroxyacetophenone, 3,4,5-trihydroxyacetophenone, 2-hydroxybenzaldehyde, 4-hydroxybenzaldehyde, 3,4,5-trihydroxybenzaldehyde, 2-hydroxybenzoic acid, 4-hydroxybenzoic acid, 3,4,5-trihydroxybenzoic acid, methyl 2-hydroxybenzoate, methyl 4-hydroxybenzoate, methyl 3,4,5-trihydroxybenzoate, phenyl 4-hydroxybenzoate, 2-hydroxybenzamide, 3-acetoamidophenol, 4-acetoamidophenol, N-phenylbenzamide, hydroxyphenyl methacrylamide, hydroxyphenyl diethylamide, 4-hydroxybenzamide or 3,4,5-trihydroxybenzamide), salicylate-based compounds (such as p-t-butylphenyl salicylate or salicylic acid), and amide compounds (such as formaldehyde). One type of these reducing agents may be used alone or two or more types may be used in combination. Among the aforementioned reducing agents, phenol-based compounds, sugars, vitamins, benzophenone-based compounds, hydroxy-based compounds and salicylate-based compounds are preferable, and benzophenone-based compounds are more preferable, since they improve the solubility in the conductive polymer solution, solution stability, reducibility as well as light resistance of the $\pi$-conjugated conductive polymer and the polyanion.

The amount of the reducing agent required to reduce the metal ions is preferably 0.1% by mass or more of the amount required to reduce the metal ions. If the amount thereof is less than this amount, there is the risk of reduction being inadequate. In addition, the amount of the reducing agent is preferably 1000% by mass or less the amount required to reduce the metal ions. This is because, since the reducibility of the metal ions does not change even if the reducing agent is contained in excess of 1000% by mass, the addition of an amount greater than this would not be beneficial.

(Solvents)

There are no particular limitations on the solvents include water, alcohols such as methanol, ethanol, propanol or butanol, carbonate compounds such as ethylene carbonate or propylene carbonate, phenols such as cresol, phenol or xylitol, ketones such as acetone or methyl ethyl ketone, hydrocarbons such as hexane, benzene or toluene, ethers such as dioxane, 2-methyltetrahydrofuran or diethyl ether, nitrile compounds such as acetonitrile, glutarodinitrile, methoxyacetonitrile, propionitrile or benzonitrile, N,N-dimethylformamide, N,N-dimethylacetoamide, N-methyl-2-pyrrolidone, hexamethylene phosphoryl triamide, 1,3-dimethyl-2-imidazolidine, dimethylimidazoline, ethyl acetate, dimethylsulfoxide, sulfolane, diphenylsulfonic acid and the like. These solvents may be used alone, two or more types may be used as a mixture or they may be used as a mixture with other organic solvents. Among these solvents, water and alcohols are preferable due to their handling ease.

(Highly Conductive Agents)

A highly conductive agent is a component to improve a conductivity of a conductive coating film formed from a conductive polymer solution.

Examples of highly conductive agents include one or more types of compounds selected from the group consisting of nitrogen-containing aromatic cyclic compound, compound having at least two hydroxy groups, a compound having at least two carboxy groups, a compound having at least one hydroxy group and at least one carboxy group, a compound having amide group, a compound having imide group, a lactam compound, a compound having glycidyl group, a silane coupling agent and a soluble organic solvent.

[Nitrogen-Containing Aromatic Cyclic Compounds]

Examples of nitrogen-containing aromatic cyclic compounds include compounds containing a single nitrogen atom such as pyridines and derivatives thereof, compounds containing two nitrogen atoms such as imidazoles and derivatives thereof, pyrimidines and derivatives thereof, and pyrazines and derivatives thereof, and compounds containing three nitrogen atoms such as triazines and derivatives thereof. From the viewpoint of the solubility within solvents, pyridines and derivatives thereof, imidazoles and derivatives thereof, and pyrimidines and derivatives thereof are preferred.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxyaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, 3-pyridinesulfonic acid and the like.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazol), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, 2-(2-pyridyl)benzimidazole, and the like.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, 2,4-pyrimidinediol, and the like.

Examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, 2,3-diethylpyrazine, and the like.

Specific examples of the triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridyl-1,3,5-triazine, 3-(2-pyridyl)-5,6-bis(4-phenylsulfonic acid)-1,2,4-triazine disodium, 3-(2-pyridyl)-5,6-diphenyl-1,2,4-triazine, 3-(2-pyridyl)-5,6-diphenyl-1,2,4-triazine-ρ,ρ'-disulfonic acid disodium, and 2-hydroxy-4,6-dichloro-1,3,5-triazine, and the like.

The amount of the nitrogen-containing aromatic cyclic compound is preferably within a range of 0.1 to 100 mol, and even more preferably from 0.5 to 30 mol, per 1 mol of anionic group units within the polyanion. From the viewpoint of the physical properties and conductivity of the conductive coating film, this amount is most preferably within a range of 1 to 10 mol. If the amount of the nitrogen-containing aromatic cyclic compound is less than 0.1 mol, then the interaction between the nitrogen-containing aromatic cyclic compound and the polyanion and conjugated conductive polymer tends to weaken, and the resulting conductivity may be inadequate. In contrast, if the amount of the nitrogen-containing aromatic cyclic compound exceeds 100 mol, then the amount of the conjugated conductive polymer is reduced, which makes it difficult to achieve a satisfactory degree of conductivity, and may alter the physical properties of the conductive coating film.

[Compound Having Two or More Hydroxy Groups]

Examples of compounds having two or more hydroxy groups include polyaliphatic alcohols such as propylene glycol, 1,3-butylene glycol, 1,4-butylene glycol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, acidum tartaricum, D-glucaric acid, and glutaconic acid;

polymer alcohols such as cellulose, polysaccharide, and sugar alcohol;

aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxyphenylsulfone, hydroxyquinone carboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinone sulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphtoic acid phenyl ester, 4,5-dihydroxynaphthalene-2,7-disulfonic acid and salts thereof, 1,8-dihydroxy-3,6-naphthalene disulfonic acid and salts thereof, 6,7-dihydroxy-2-naphthalene sulfonic acid and salts thereof, 1,2,3-trihydroxybenzene(pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate; hydroquinonesulfonic acid potassium, and the like.

The amount of the compound having two or more hydroxy groups is preferably within the range of 0.05 to 50 mol, and more preferably within the range of 0.3 to 10 mol, per mol of anionic group unit of the polyanion. If the amount of the compound containing two or more hydroxy groups is less than 0.05 mol per 1 mol of anionic group units within the polyanion, then the resulting conductivity and heat resistance may be inadequate. If the amount of the compound having two or more hydroxy groups per mole of anionic group unit of the polyanion exceeds 50 mol per 1 mol of anionic group units within the polyanion, the amount of the π-conjugated conductive polymer within the conductive coating film is reduced, which makes it difficult to achieve a satisfactory degree of conductivity.

(Compounds Having Two or More Carboxy Groups)

Examples of compounds having two or more carboxy groups include aliphatic carboxylic acid compound such as maleic acid, fumaric acid, itaconic acid, citraconic acid, malonic acid, 1,4-butanedicarboxylic acid, succinic acid, acidum tartaricum, adipic acid, D-glucaric acid, glutaconic acid and citric acid; aromatic carboxylic acid compound which at least one carboxy broup is bonded to a aromatic ring such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic anhydride, biphenyl-tetracarboxylic dianhydride, benzophenone-tetracarboxylic dianhydride, naphthalenedicarboxylic acid, trimellitic acid, pyromellitic acid; diglycolic acid, diglycolic acid, oxydibutyric acid, thiodiacetic acid (thiodiacetic acid), thiodilactic acid, iminodiacetic acid, iminolactic acid, and the like.

The amount of the compound containing two or more carboxy groups is preferably within a range of 0.1 to 30 mol, and even more preferably from 0.3 to 10 mol, per 1 mol of anionic group units within the polyanion. If the amount of the compound containing two or more carboxy groups is less than 0.1 mol per 1 mol of anionic group units within the polyanion, then the resulting conductivity and heat resistance may be inadequate. In contrast, if the amount of the compound containing two or more carboxy groups exceeds 30 mol per 1 mol of anionic group units within the polyanion, then the amount of the π-conjugated conductive polymer within the conductive coating film is reduced, which makes it difficult to achieve a satisfactory degree of conductivity, and may alter the physical properties of the conductive coating film.

[Compounds Containing One or More Hydroxy Groups and One or More Carboxy Groups]

Examples of the compounds containing one or more hydroxy groups and one or more carboxy groups include tartaric acid, glyceric acid, dimethylolbutanoic acid, dimethylolpropanoic acid, D-glucaric acid, glutaconic acid, and the like.

The amount of the compound containing one or more hydroxy groups and one or more carboxy groups is preferably within a range of 1 to 5,000 parts by mass, and even more preferably within a range of 50 to 500 parts by mass, based on a value of 100 parts by mass for the total amount of π-conjugated conductive polymer and polyanion. If the amount of the compound containing one or more hydroxy groups and one or more carboxy groups is less than 1 part by mass, then the resulting conductivity and heat resistance may be inadequate. In contrast, if the amount of the compound containing one or more hydroxy groups and one or more carboxy groups exceeds 5,000 parts by mass, then the amount of the π-conjugated conductive polymer within the conductive coating film is reduced, making it difficult to achieve a satisfactory degree of conductivity.

[Amide Compounds]

A compound having amide group is a monomer compound having an amide bond in the molecule represented by —CO—NH—(CO is double bond). Examples of amide compounds include compounds having functional groups at both ends of the amide bond, a compound having a cyclic compound at one end of the amide bond, and a urea and urea derivative wherein the functional group of both ends are hydrogen.

Examples of amide compounds include acetamide, malonamide, succinimide, maleamide, fumaramide, benzamide, naphthamide, phthalamide, isophthalamide, terephthalamide, nicotinamide, isonicotinamide, 2-phthalamide, formamide, n-methyl formamide, propionamide, propiolamide, butyramide, isobutyramide, methacrylamide, palmitamide, stearylamide, oleamide, oxamide, glutaramide, adipamide, cinnamamide, glycolamide, lactamide, glyceramide, tartaramide, citramide, glyoxylamide, pyruvamide, acetacetamide, dimethylacetamide, benzylamine, anthranilamide, ethylenediaminetetraacetamide, diacetamide, triacetamide, dibenzamide, tribenzamide, rhodanine, urea, 1-acetyl-2-thiourea, biuret, butylurea, 1,3-dimethylurea, 1,3-diethylurea, derivatives thereof, and the like.

In addition, acrylamide may be used as an amide compound.

Examples of acrylamides include N-methyl acrylamide, N-methyl methacrylamide, N-ethyl acrylamide, N-ethyl methacrylamide, N,N-dimethyl acrylamide, N,N-dimethyl methacrylamide, N,N-diethyl acrylamide, N,N-diethyl methacrylamide, 2-hydroxyethyl acrylamide, 2-hydroxyethyl methacrylamide, N-methylol acrylamide, N-methylol methacrylamide, and the like.

Molecular weight of amide compound is preferably 46 to 10,000, more preferably 46 to 5,000 and most preferably 46 to 1,000.

The amount of the amide compound is preferably within a range of 1 to 5,000 parts by mass, and more preferably within a range of 50 to 500 parts by mass, based on a value of 100 parts by mass for the total amount of π-conjugated conductive polymer and polyanion. If the amount of the amide compound is less than 1 part by mass, then the resulting conductivity and heat resistance may be inadequate. In contrast, if the amount of the amide compound exceeds 5,000 parts by mass, then the amount of the π-conjugated conductive polymer within the conductive coating film is reduced, making it difficult to achieve a satisfactory degree of conductivity.

[Imide Compounds]

As an amide compound, a monomer compound having imide bond (to be referred to as an imide compound) is preferable to achieve higher degree of conductivity. Examples of imide compounds include phthalimide and derivative thereof, succinimide and derivative thereof, benzimidie and derivative thereof, maleimide and derivative thereof, naphthalimide and derivative thereof, and the like.

In addition, imide compounds are categorized into aliphatic imide, aromatic imide and the like by the type of functional groups at both ends of imide compounds. From a viewpoint of solubility, aliphatic imide is preferably used.

Furthermore, aliphatic imide compound are categorized into saturated aliphatic imide compound having saturated bond between carbons in the molecule, unsaturated aliphatic imide compound having an unsaturated bond between carbons in the molecule.

The saturated aliphatic imide compound is a compound represented by R1—CO—NH—CO—R2, and both of the R1 and R2 are compounds having saturated hydrocarbons. Examples of saturated aliphatic imide compounds include cyclohexane-1,2-dicarboxyimide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoin acetic acid, N-hydroxy-5-norbornene-2,3-dicarboxyimide, semicarbazide, α,α-dimethyl-6-methylsuccinimide, bis[2-(succinimideoxycarbonyloxy)ethyl]sulfone, α-methyl-α-propylsuccinimide, cyclohexylimide and the like.

The unsaturated aliphatic imide compound is a compound represented by R1—CO—NH—CO—R2, and one of or both of the R1 and R2 of the unsaturated aliphatic imide compound has at least one unsaturated bond. Examples of unsaturated aliphatic imide compounds include 1,3-dipropylene urea, maleimide, N-methylmaleimide, N-ethylmaleimide, N-hydroxymaleimide, 1,4-bismaleimidebutane, 1,6-bismaleimidehexane, 1,8-bismaleimideoctane, N-carboxyheptyl maleimide and the like.

Molecular weight of imide compound is preferably from 60 to 5,000, more preferably from 0 to 1,000 and most preferably from 80 to 500.

The amount of the imide compound is preferably within a range of 10 to 10,000 parts by mass, and more preferably from 50 to 5,000 parts by mass, based on a value of 100 parts by mass for the total amount of π-conjugated conductive polymer and polyanion. If the amount added of the amide compound and the imide compound are less than the lower limit of the above range, the effect achieved by adding the amide compound and the imide compound tends to diminish, which is also undesirable. In contrast, if the amount added of the amide compound and imide compound exceeds the upper limit of the above range, then the conductivity tends to decrease as a result of the reduction in the concentration of the π-conjugated conductive polymer, which is also undesirable.

[Lactam Compounds]

A lactam compound is an intramolecular cyclic amide of an aminocarboxyic acid, and is a compound in which a portion of the ring can be represented by —CO—NR— (wherein R is a hydrogen atom or an arbitrary substituent). One or more of the carbon atoms within the ring may be unsaturated or substituted for a hetero atom.

Examples of the lactam compound include pentano-4-lactam, 4-pentanelactam-5-methyl-2-pyrrolidone, 5-methyl-2-pyrrolidinone, hexano-6-lactam, 6-hexanelactam and the like.

The amount of the lactam compound is preferably within a range of 10 to 10,000 parts by mass, and even more preferably from 50 to 5,000 parts by mass, based on a value of 100 parts by mass for the total amount of π-conjugated conductive polymer and polyanion. If the amount added of the lactam compound is less than the lower limit of the above range, then the effect achieved by adding the lactam compound tends to be diminished, which is undesirable. In contrast, if the amount added of the lactam compound exceeds the upper limit of the above range, then the conductivity tends to decrease as a result of the reduction in the concentration of the π-conjugated conductive polymer, which is also undesirable.

[Compounds Containing Glycidyl Groups]

Examples of the compound containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A, diglycidyl ether, glycidyl acrylate, glycidyl ether methacrylate, and the like.

The amount of the compound containing a glycidyl group is preferably within a range of 10 to 10,000 parts by mass, and more preferably from 50 to 5,000 parts by mass, based on a value of 100 parts by mass for the total amount of π-conjugated conductive polymer and polyanion. If the amount added of the compound containing a glycidyl group is less than the lower limit of the above range, then the effect achieved by adding the compound containing a glycidyl group tends to diminish, which is undesirable. In contrast, if the amount added of the compound containing a glycidyl group exceeds the upper limit of the above range, then the conductivity tends to decrease as a result of the reduction in the concentration of the π-conjugated conductive polymer, which is also undesirable.

[Silane Coupling Agents]

Examples of silane coupling agents include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacyloxypropylmethyldimethoxysilane, 3-methacyloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochloride of N-(vinylbenzyl)-2-aminoethyl-3-aminopropyltrimethoxysilane, 3-ureidopropyltriethoxysilane, 3-chloropropyltrimethoxysilane, 3-mercaptopropylmethylditrimethoxysilane, 3-mercaptopropyltrimethoxysilane, bis(triethoxysilylpropyl)tetrasulfide, 3-isocyanatepropyltriethoxysilane and the like.

The silane coupling agent is capable of adding an arbitrary amount as necessary, and the amount is not particularly limited. The amount of the silane coupling agent is preferably within a range from 10 to 10,000 parts by mass based on a value of 100 parts by mass for the total amount of π-conjugated conductive polymer and polyanion.

[Soluble Organic Solvents]

Examples of soluble organic solvents include polar solvents such as N-methyl-2-pyrrolidone, N-methylacetamide, N,N-dimethylformamide, N,N-dimethylacetamide, dimethylsulfoxide, hexamethylenephosphortriamide, N-vinylpyrrolidone, N-vinylformamide, N-vinylacetamide, and the like; phenols such as cresol, phenol, xylenol, and the like; polyhydric aliphatic alcohols such as ethylene glycol, propylene glycol, dipropylene glycol, 1,3-butylene glycol, 1,4-butylene glycol, D-glucose, D-glucitol, isoprene glycol, butanediol, 1,5-pentanediol, 1,6-hexanediol, 1,9-nonanediol, neopentyl glycol, and the like; carbonate compounds such as ethylene carbonate, propylene carbonate, and the like; ether compounds such as dioxane, diethyl ether, and the like; chain-like ethers such as dialkyl ethers, propylene glycol dialkyl ethers, polyethylene glycol dialkyl ethers, polypropylene glycol dialkyl ethers, and the like; heterocyclic compounds such as 3-methyl-2-oxazolidinone, and the like; and nitrile compounds such as acetonitrile, glutarodinitrile, methoxyacetonitrile, propionitrile, benzonitrile, and the like. These solvents may be used either alone, or as mixtures containing two or more different solvents.

(Additives)

Additives may also be contained in the conductive polymer solution as necessary.

There are no particular limitations on the additives provided they can be mixed with the π-conjugate conductive polymer and the polyanion, and examples of additives include alkaline compounds, surfactants, antifoaming agents, coupling agents, antioxidants, ultraviolet absorbers, organic titanium compound, organic zirconium compound, and the like.

Known inorganic alkaline compounds or organic alkaline compounds can be used for the alkaline compound. Examples of inorganic alkaline compounds include sodium hydroxide, potassium hydroxide, calcium hydroxide, ammonia, and the like.

Examples of organic alkaline compounds include aliphatic amines, aromatic amines, quaternary amines, nitrogen-containing compounds other than amines, metal alkoxides, dimethylsulfoxide, and the like. Among these, one type or two or more types selected from the group consisting of aliphatic amines, aromatic amines and quaternary amines are preferable since they further enhance electrical conductivity.

Examples of surfactants include anionic surfactants such as carboxyic acid salts, sulfonic acid salts, sulfuric acid ester salts, phosphoric acid ester salts; cationic surfactants such as amine salts or quaternary ammonium salts; amphoteric surfactants such as carboxybetaine, aminocarboxylic acid salts, imidazolium betaine, and the like; nonionic surfactants such as polyoxyethylene alkyl ethers, polyoxyethylene glycerin fatty acid esters, ethylene glycol fatty acid esters, polyoxyethylene fatty acid amides, and the like.

Examples of antifoaming agents include silicone resin, polydimethylsiloxane, silicone resin, and the like.

Examples of coupling agents include silane coupling agents having a vinyl group, amino group or epoxy group, and the like.

Examples of antioxidants include phenol-based antioxidants, amine-based antioxidants, phosphorous-based antioxidants, sulfur-based antioxidants, sugars, vitamins, and the like.

Examples of ultraviolet absorbers include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorbers, hindered amine-based ultraviolet absorbers, benzoate-based ultraviolet absorbers, and the like.

Antioxidants and ultraviolet absorbers are preferably used in combination.

(Production Method of Conductive Polymer Solutions)

The production method of the conductive polymer solution consists of, for example, preparing a conductive polymer solution by chemical oxidative polymerization of a precursor monomer of π-conjugated conductive polymer in an aqueous solution of polyanion, and adding oxetane compounds and arbitrary components as necessary to this aqueous solution.

According to the conductive polymer solution of the present invention containing oxetane compounds, it enables forming of a transparent conductive coating film of high preservation stability. In addition, the conductive polymer solution containing oxetane compounds has high preservation stability.

<Conductive Coating Films>

The conductive coating film of the present invention has formed by coating the aforementioned conductive polymer solution onto a transparent base and the like. The conductive coating film contains a π-conjugated conductive polymer, a polyanion and a hardened material of an oxetane compound as essential components.

Examples of coating methods that are applied for the coating method of the conductive polymer solution include comma coating, reverse coating, lip coating, microgravure coating, and the like.

Examples of transparent bases coated with the conductive polymer solution that can be used include films or sheets made of polyethylene terephthalate (PET), polyethylene naphthalate, polyethersulfone, polyetherimide, polyether ether ketone, polyphenylene sulfide, polyarylate, polyimide, polycarbonate, cellulose triacetate or cellulose acetate propionate, and the like. In addition, glass plates, silicon plates, and the like can also be used.

Hardening treatment is preferably carried out after coating with the conductive polymer solution.

Radiation of heat or light is applied for the hardening method. Ordinary methods can be employed for the heating method, such as hot air heating or infrared heating. In addition in the case of hardening by light irradiation, a method can be employed in which ultraviolet light is radiated from a light source such as a super-high pressure mercury lamp, high-pressure mercury lamp, low-pressure mercury lamp, carbon arc lamp, xenon arc lamp, metal halide lamp or the like. Illuminance during radiation of ultraviolet light is preferably 100 mW/cm$^2$. If the illuminance is less than 100 mW/cm$^2$, crosslinking becomes inadequate and sliding resistance (durability) of the conductive coating film tends to be low. Furthermore, illuminance in the present invention refers to the value measured using the Topcon Model UVR-T1 (industrial-use UV checker, light receiver: UD-T36, measuring wavelength range: 300 to 390 nm, peak sensitivity: approx. 355 nm).

The conductive coating film of the present invention is formed from the aforementioned conductive polymer solution. Therefore, the conductive coating film of the present invention has high water-resistance and low contact resistance with respect to an ITO film.

Although the conductive coating film of the present invention is preferably used in, for example, an input device described below, it may also be used as a transparent electrode of a display device. Examples of display devices include an electroluminescence display and a liquid crystal display.

<Input Device>

An example of the embodiment of an input device of the present invention is the following.

FIG. 1 shows an input device of an example of the present invention. The input device 1 of the embodiment of the present invention is a resistive film type touch panel having a movable electrode sheet 10 placed on the side of an input operator, a stationary electrode sheet 20 placed on the side of an image display device in mutual opposition to the movable electrode sheet 10, a transparent dot spacer 30 placed between the movable electrode sheet 10 and the stationary electrode sheet 20.

The movable electrode sheet 10 consists of a first transparent base 11, and a first transparent conductive coating film 12 having the conductive coating film provided on the surface of the first transparent base 11.

The stationary electrode sheet 20 consists of a second transparent base 21, and a second transparent conductive coating film 22 arranged on the surface of the second transparent base 21.

The first transparent conductive coating film 12 and the second transparent conductive coating film 22 are in mutually opposition so as to contact the first transparent conductive coating film 12 and the second transparent conductive coating film 22 when the first transparent conductive coating film 12 is pressed.

<Movable Electrode Sheet>

(First Transparent Base)

Examples of the first transparent bases 11 constituting the movable electrode sheet 10 include a transparent resin film having a single layer or two or more layers, glass plate, and a laminate of a plastic film and glass plate. Among these, a transparent resin film is preferable due to its flexibility.

Examples of a transparent resin constituting a transparent resin film includes polyethylene terephthalate (PET), polyethylene naphthalate, polyethersulfone, polyetherimide, polyetheretherketone, polyphenilensulfide, polyarylate, polyimide, polycarbonate, cellurose triacetate, cellulose acetate butyrate and the like.

The thickness of the first transparent base 11 is preferably 100 to 250 μm.

If the thickness of the first transparent base 11 is 100 μm or more, adequate strength can be secured. If the thickness is 250 μm or less, adequate flexibility can be secured.

(First Transparent Conductive Coating Film)

The thickness of the first transparent conductive coating film 12 is preferably 50 to 700 μm.

If the thickness of the first transparent conductive coating film 12 is 50 μm or more, adequate electrical conductivity can be secured, while if the thickness is 700 μm or less, adequate flexibility and transparency can be secured.

<Stationary Electrode Sheet>

(Second Transparent Base)

The same first transparent base 11 can be used as the second transparent bases 21 constituting the stationary electrode sheet 20. Especially, the second transparent base 21 is preferably a glass plate since the movable electrode sheet 10 can be supported through the dot spacer 30.

The thickness of the second transparent base 21 is preferably 0.8 to 2.5 mm.

If the thickness of the second transparent base 21 is 0.8 mm or more, adequate strength can be secured, while if the thickness is 2.5 mm or less, the transparent base 21 can be made to be thin thereby realizing conservation of space.

(Second Transparent Conductive Coating Film)

The second transparent conductive coating film 22 is made by a transparent conductive metal oxide. Examples of a transparent conductive metal oxide constituting the second transparent conductive coating film 22 includes indium oxide, tin oxide, indium tin-doped oxide (ITO), antimony tin-doped oxide (ATO), fluorine tin-doped oxide (FTO), aluminum zinc-doped oxide (AZO), zinc oxide, and the like.

The thickness of the second transparent conductive coating film 22 is preferably 0.01 to 1.0 μm. If the thickness of the second transparent conductive coating film 22 is 0.01 μm or more, adequate electrical conductivity can be secured, while if the thickness is 1.0 μm or less, the second transparent conductive coating film 22 can be made to be thin thereby realizing conservation of space.

<Gap Between Movable Electrode Sheet and Stationary Electrode Sheet>

The gap between the movable electrode sheet 10 and the stationary electrode sheet 20 when not pressed together is preferably 20 to 100 μm. If the gap between the movable electrode sheet 10 and the stationary electrode sheet 20 when not pressed together is 20 μm or more, the movable electrode sheet 10 and the stationary electrode sheet 20 can be reliably prevented from making contact when not pressed together, while if the gap is 100 μm or less, the movable electrode sheet 10 and the stationary electrode 20 can be reliably contacted when pressed together.

The size of the dot spacers 30 is suitably selected in order to achieve the gap as described above.

<Usage and Application of Input Device>

Figure 2:
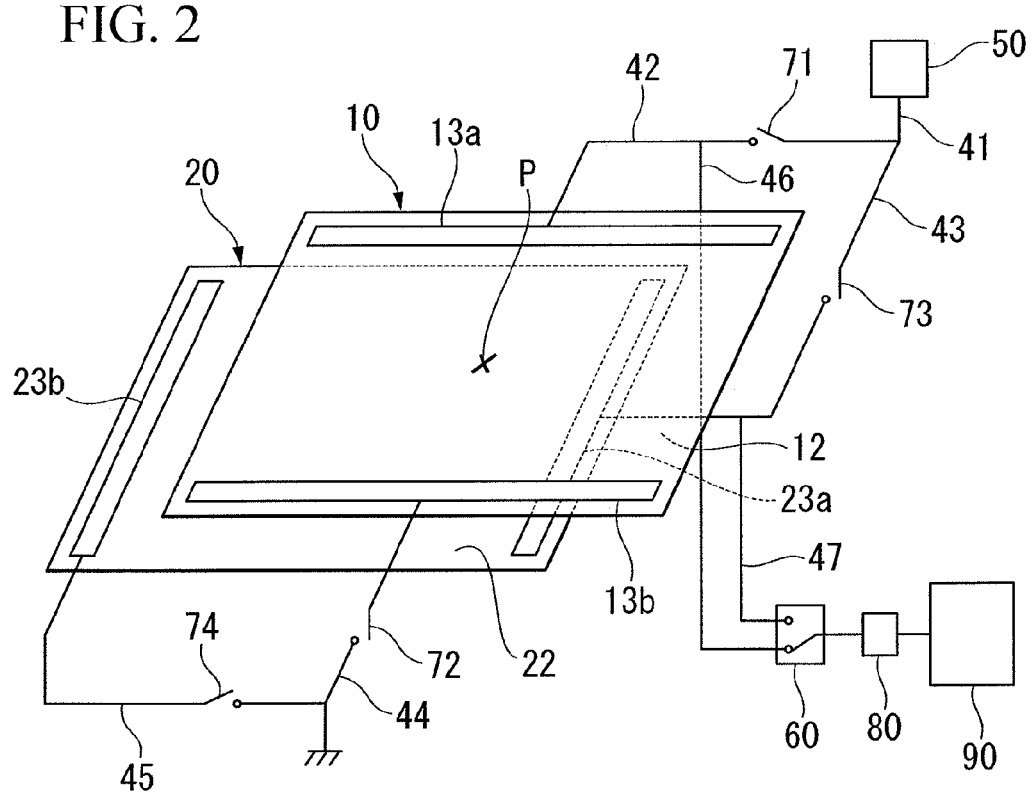
FIG. 2 is a figure showing a usage of the input device illustrated in FIG. 1.

As shown in FIG. 2, the first electrode 13a and the second electrode 13b are placed along the long side (X direction) at the both ends of the short side (Y direction) of the movable electrode sheet 10 of the input device. In addition, the third electrode 23a and the fourth electrode 23b are placed along the short side at the both ends of the short side (Y direction) of the stationary electrode sheet 20.

A power supply 50 is connected to the first electrode 13a through the first wire 41 and the second wire 42, and the power supply 50 is connected to the third electrode 23a through the first wire 41 and the third wire 43.

The second electrode 13b is grounded through the fourth wire 44, and the fourth electrode 23b is placed through the fifth wire 45.

The second wire 42 is connected to the multiplexer 60 through the sixth wire 46.

The third wire 43 is connected to the multiplexer 60 through the seventh wire 47. In addition, the first switch 71 is placed closer to the power supply 50 than the connection point of the sixth wire 46 on the second wire 42. The second switch 72 is placed on the fourth wire 44. The third switch 73 is placed closer to the power supply 50 than the connection point of the seventh wire 47 on the third wire 43. The fourth switch 74 is placed on the fifth wire 45.

A voltage measurement device 90 is connected to the multiplexer 60 through the eighth wire 78, sample hold circuit 80 and the ninth wire 79.

When detecting X-coordinate at the pressure point in the state of pressed movable electrode sheet 10, turn off the first switch 71 and the second switch 72, and turn on the third switch 73 and the fourth switch 74. Then, voltage distribution is formed between the third electrode 23a of the second transparent conductive coating film 22 of the stationary electrode sheet 20 and the fourth electrode 23b. Then, the entire electrical potential of the first transparent conductive coating film 12 of the movable electrode sheet 10 needs to be the same electric potential with the contact point P of the first transparent conductive coating film 12 in the second transparent coating film 22.

Then, the electrical potential of the contact point P to the first transparent conductive coating film 12 of the movable electrode sheet 10 with the second transparent conductive coating film 22 of the stationary electrode sheet 20 is measured by the voltage measurement device 90 through the first transparent conductive coating film 12, the second wire 42, the sixth wire 46, the multiplexer 60, the eighth wire 78, the sample hole circuit 80 and the ninth wire 79. X-coordination is measured based on the electrical potential difference provided by the measurement, and the difference of the electrical potential between the third electrode 23a and the fourth electrode 23b.

In addition, when detecting Y-coordinate at the pressure point, turn on the first switch 71 and the second switch 72, and turn off the third switch 73 and the fourth switch 74. Then, voltage distribution is formed between the first electrode 13a of the first transparent conductive coating film 12 of the movable electrode sheet 10 and the second electrode 13b.

Then, the entire electrical potential of the second transparent conductive coating film 22 of the stationary electrode sheet 20 needs to be the same electric potential with the contact point P of the second transparent conductive coating film 22 in the first transparent coating film 12.

Then, the electrical potential of the contact point P to the first transparent conductive coating film 12 of the movable electrode sheet 10 with the second transparent conductive coating film 22 of the stationary electrode sheet 20 is measured by the voltage measurement device 90 through the second transparent conductive coating film 22, the third wire 73, the seventh wire 77, the multiplexer 60, the eighth wire 78, the sample hole circuit 80 and the ninth wire 79. Y-coordinate is measured based on the electrical potential difference provided by the measurement, and the difference of the electrical potential between the first electrode 13a and the second electrode 13b.

In the above coordination detection, it is preferable to measure the electrical potential at the contact point P to the first transparent conductive coating film 12 with the second transparent conductive coating film 22 after turning On-Off of the first to fourth switches, and further passing a predetermined time. If the first transparent conductive coating film 12 includes π-conjugated conductive polymer, it takes time to stabilize the electrical potential even though the resistance value is not big. However, if the electrical potential is measured after turning On-Off of the first to fourth switches, and further passing a predetermined time, electrical potential can be measured in a stable state since reduction of the measurement accuracy can be suppressed.

This type of input device 1 is installed in, for example, electronic organizers, personal digital assistants (PDA), cell phones, PHS, automated teller machines (ATM), vending machines or point-of-sale (POS) cash registers.

<Function Effect>

The input device 1 explained above is excellent in water resistance because the first transparent conductive coating film 12 constituting the movable electrode sheet 10 contains a hardened material of oxetane compounds.

EXAMPLES

Although the following indicates specific examples of the present invention, the present invention is not limited to these examples.

Production Example 1

Preparation of Polystyrene Sulfonic Acid 206 g of sodium styrene sulfonate were dissolved in 1000 ml of ion exchange water followed by dropping in over the course of 20 minutes 1.14 g of an ammonium persulfate oxidizing agent solution preliminarily dissolved in 10 ml of water while stirring at 80° C. and then continuing to stir for 2 hours.

1000 ml of sulfuric acid diluted to 10% by mass and 10000 ml of ion exchange water were added to the resulting solution containing sodium styrene sulfonate, about 10000 ml of solution containing sodium polystyrene sulfonate were removed by ultrafiltration, 10000 ml of ion exchange water were added to the residual liquid, and about 10000 ml of solution were removed by ultrafiltration. The above ultrafiltration procedure was repeated three times.

Moreover, about 10000 ml of ion exchange water were added to the resulting liquid, and about 10000 ml of solution were removed by ultrafiltration. This ultrafiltration procedure was repeated three times.

The ultrafiltration conditions were as indicated below (to apply similarly in other examples as well).

Cut-off molecular weight of ultrafiltration membrane: 30000
Cross-flow type
Supplied liquid flow rate: 3000 ml/min
Membrane pressure: 0.12 Pa Water present in the resulting solution was removed under reduced pressure to obtain polystyrene sulfonic acid in the form of a colorless solid.

Production Example 2

Preparation of Aqueous Solution of Polystyrene Sulfonic Acid-Doped Poly(3,4-ethylenedioxythiophene)

14.2 g of 3,4-ethylenedioxythiophene were mixed at 20° C. with a solution in which 36.7 g of the polystyrene sulfonic acid obtained in Production Example 1 were dissolved in 2000 ml of ion exchange water.

29.64 g of ammonium persulfate dissolved in 200 ml of ion exchange water and 8.0 g of an oxidation catalyst solution of ferric sulfate were slowly added while holding the resulting mixed solution at 20° C. and stirring followed by allowing to react for 3 hours while being stirred.

2000 ml of ion exchange water were added to the resulting reaction liquid followed by removing about 2000 ml of the solution using ultrafiltration. This procedure was repeated three times.

200 ml of sulfuric acid diluted to 10% by mass and 2000 ml of ion exchange water were added to a liquid on which the aforementioned filtration treatment had been carried out, about 2000 ml of the treated liquid were removed by ultrafiltration, 2000 ml of ion exchange water were added thereto, and about 2000 ml of liquid were removed by ultrafiltration. This procedure was repeated three times.

Moreover, 2000 ml of ion exchange water were then added to the resulting treated liquid followed by removing about 2000 ml of treated liquid by ultrafiltration. This procedure was repeated five times to obtain a blue aqueous solution containing about 1.2% by mass of polystyrene sulfonic acid-doped poly(3,4-ethylenedioxythiophene) (PEDOT-PSS).

Example 1

6.0 g of silver colloid particles (manufactured by Nanosize Inc. AG321, ethylene glycol solvent, 50% by mass concentration), 1.8 g of garlic acid, 4.2 g of 4,4'-(3-ethyloxetane-3-ylmethyloxymethyl)biphenyl (manufactured by Ube industries Ltd. OXBP) (63.9% by mass of 4,4'-(3-ethyloxetane-3-ylmethyloxymethyl)biphenyl based on a value of 100% by mass for the total amount of π-conjugated conductive polymer and polyanion), 20 g of 2-hydroxyethylacrylamide, 0.092 g of Sanaid SI-110L (manufactured by Sanshin Chemical Industry Co., Ltd.), and 800 g of ethanol were mixed and stirred. 600 g of the PEDOT-PSS aqueous solution obtained in Production Example 2 were then added to the resulting mixed solution, followed by dispersing with a homogenizer to obtain a conductive polymer solution A.

A conductive coating film was then formed by coating a conductive polymer solution A with polyethylene terephthalate film which is a first transparent base (manufactured by Toyobo Co., Ltd. A4300, thickness; 188 μm, light transmission; 93.5%, haze value; 0.68%) by a reverse coater, followed by drying the conductive coating film with hot air at 120 degrees Celsius for 2 minutes.

[Surface Resistance Value]

Surface resistance values were measured in compliance with HS K 7194 using the Loresta MCP-T600 manufactured by Mitsubishi Chemical Corp.

[Light Transmittance]

Light transmittance was measured in compliance with JIS K 7136 using a haze meter measuring instrument (NDH5000) manufactured by Nippon Denshoku Industries Co., Ltd.

[Contact Resistance]

Figure 3:
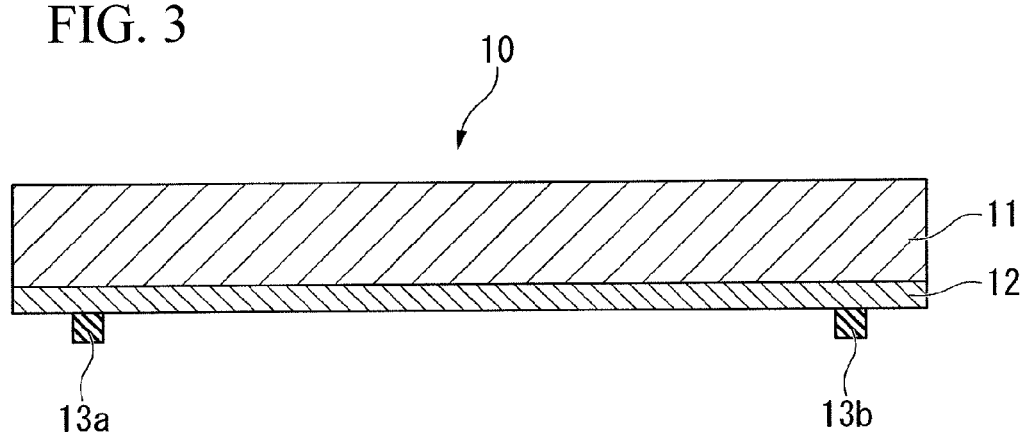
FIG. 3 is a cross-sectional view showing an example of a movable electrode sheet constituting an input device.

The conductive polymer solutions were coated onto a first transparent base 11 (polyethylene terephthalate film, A4300 manufactured by Toyobo Co., Ltd., thickness: 188 μm) to form a first transparent conductive coating film 12 which was then cut to a size of 40 mm×50 mm. A conductive paste (FA-401CA manufactured by Fujikura Kasei Co., Ltd.) was screen-printed onto the edges of the cut sheet of the first transparent conductive coating film 12 in the direction of width followed by drying to form electrode wires 13a and 13b and obtain a movable electrode sheet 10 for use on the side of an input operator (see FIG. 3).

In addition, the second transparent conductive coating film 22 made from ITO (surface resistance: 300Ω) was provided on a surface of the second transparent base 21 made from glass, and a sheet for electrode which was cut to a size of 40 mm×50 mm was prepared. A conductive paste (XA436 manufactured by Fujikura Kasei Co., Ltd.) was screen-printed onto the edges of the second transparent conductive coating film 22 in the lengthwise direction of the sheet for electrode followed by drying to form electrode wires 23a and 23b. Next, a paste for dot spacers (SN-8400C manufactured by Fujikura Kasei Co., Ltd.) was screen-printed onto the second transparent conductive coating film 22 followed by drying and irradiating with ultraviolet light to form dot spacers 30.

Figure 4:
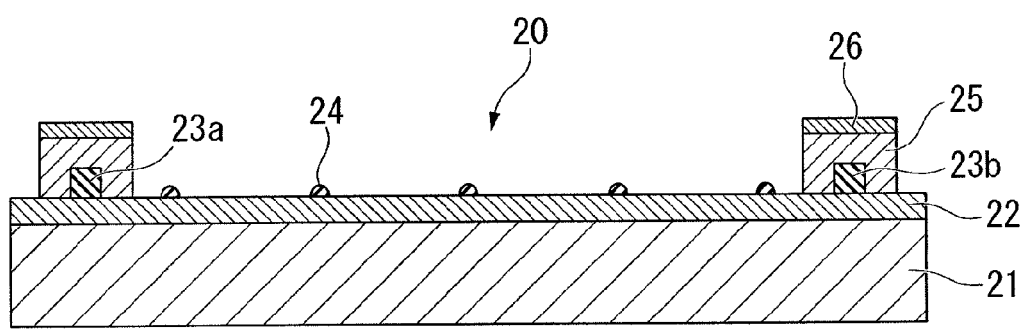
FIG. 4 is a cross-sectional view showing a stationary electrode sheet constituting an input device.

Next, a resist paste (SN-8800G manufactured by Fujikura Kasei Co., Ltd.) was screen-printed onto the electrode wires 23a and 23b followed by drying and irradiating with UV light to form insulating layers 25. Moreover, an adhesive (XB-114 manufactured by Fujikura Kasei Co., Ltd.) was screen-printed onto the insulating layers 25 followed by drying to obtain adhesive layers 26 for affixing to a movable electrode sheet 10. As a result, a stationary electrode sheet 20 was obtained for an image display device (see FIG. 4).

Next, as shown in FIG. 1, the movable electrode sheet 10 and the stationary electrode sheet 20 were arranged so that the first transparent conductive coating film 12 and the second transparent conductive coating film 22 were mutually opposed followed by laminating with the adhesive layers 26 to fabricate a resistive film type touch panel module. In addition, the input device illustrated in FIG. 2 was produced with the use of a resistive film type touch panel module.

Then, the movable electrode sheet 10 was pressed with a load of 250 g with a polyacetal stylus having an 0.8 R tip and a voltage of 5 V was applied by the power supply 50, and contact resistance was then measured on the basis of these measurement results.

[Rubbing Test]

In order to measure the coating film strength of the first transparent conductive coating films, the first transparent conductive coating films were rubbed 30 times back and forth with a Kimwipe (Nippon Paper Crecia Co., Ltd.) moistened with water or alcohol (methanol and/or ethanol) while applying a load of 400 gf/cm² followed by visually inspecting the conductive coating films for missing portions thereof. In addition, contact resistance was measured following this rubbing test. These results were used as an indicator of the water resistance and solvent resistance of the first transparent conductive coating films.

A: No peeling
B: Slight peeling
C: Some peeling
D: Complete peeling

A conductive coating film was then formed and evaluated in the same manner as Example 1 with using the conductive polymer solution C. The evaluation results are shown in Table 1.

Example 4

20.1 g of imidazole (2 mol equivalents based on the polyanion) were added to 600 g of the PEDOT-PSS aqueous solu-

TABLE 1

|  | Amount of oxetane added | Surface resistance (Ω) | Light Transmittance (%) | Haze value (%) | Contact resistance (Ω) | Rubbing Test | |
|---|---|---|---|---|---|---|---|
|  |  |  |  |  |  | Water | Alcohol |
| Example 1 | 58.3 | 570 | 88.5 | 0.88 | 960 | A | A |
| Example 2 | 85.0 | 580 | 88.6 | 0.92 | 980 | A | A |
| Example 3 | 250.0 | 640 | 88.2 | 1.18 | 1350 | A | A |
| Example 4 | 416.7 | 650 | 88.0 | 1.20 | 1890 | A | A |
| Example 5 | 34.7 | 570 | 88.4 | 0.90 | 970 | A | A |
| Example 6 | 13.9 | 560 | 88.4 | 0.91 | 930 | A | B |
| Comparative Example 1 | 0.6 | 550 | 88.8 | 0.93 | 910 | C | D |
| Comparative Example 2 | 555.6 | 880 | 88.1 | 1.15 | 6430 | A | A |

The amount of oxetane added in Table 1 is the amount of oxetane compound added based on a value of 100% by mass for the total amount of π-conjugated conductive polymer and polyanion.

Example 2

0.5 g of silver particles (manufactured by Ferro Japan Corporation, RDS11000-10, average particle size; 1.0 μm), 6.12 g of 3-ethyl-3{[(3-ethyloxetane-3-yl)methoxy]methyl}oxetane (Manufactured by TOAGOSEI OXT221) (85.0% by mass of 3-ethyl-3{[(3-ethyloxetane-3-yl)methoxy]methyl}oxetane based on a value of 100% by mass for the total amount of π-conjugated conductive polymer and polyanion), 1.8 g of 2,3,3',4,4',5-hexahydroxybenzophenone, 20 g of 2-hydroxyethylacrylamide, 3.8 g of Sanaid SI-110L (manufactured by Sanshin Chemical Industry Co., Ltd.), and 800 g of ethanol were mixed and stirred. 600 g of the PEDOT-PSS aqueous solution obtained in Production Example 2 were then added to the resulting mixed solution, followed by dispersing with a homogenizer to obtain a conductive polymer solution B.

A conductive coating film was then formed and evaluated in the same manner as Example 1 with use of the conductive polymer solution B. The evaluation results are shown in Table 1.

Example 3

0.5 g of silver bromide was added to the 600 g of the PEDOT-PSS aqueous solution obtained in Production Example 2, followed by dispersing with a Nanomizer (manufactured by Yoshida Kikai Co., Ltd.) to prepare a PEDOT-PSS aqueous solution having silver bromide.

Separate from the above, 18.0 g of xylene bisoxetane (OXT121, manufactured by TOAGOSEI Co., Ltd.) (250.0% by mass of the xylene bisoxetane based on the total amount of π-conjugated conductive polymer and polyanion), 1.8 g of 2,3,3',4,4', 5-hexahydroxybenzophenone, 20 g of 2-hydroxyethylacrylamide, 36.4 g of pyromellitic acid, and 800 g of ethanol were mixed and stirred. The PEDOT-PSS aqueous solution including the silver bromide was added to the resulting solution followed by stirring to obtain a conductive polymer solution C.

tion obtained in Production Example 2 followed by stirring to prepare a PEDOT-PSS aqueous solution containing imidazole.

Separate from the above, 30.0 g of 4,4'-(3-ethyloxetane-3-ylmethyloxymethyl)biphenyl (manufactured by Ube industries Ltd. OXBP) (416.7% by mass of 4,4'-(3-ethyloxetane-3-ylmethyloxymethyl)biphenyl based on a value of 100% by mass for the total amount of π-conjugated conductive polymer and polyanion), 1.8 g of garlic acid methyl, 20 g of 2-hydroxyethylacrylamide, 0.6 g of WPI-113 (manufactured by Wako Pure Chemical Industries, Ltd., 50% by mass of nonvolatile amount), 800 g of ethanol, 0.3 g of gallium-doped zinc oxide (Hakusuitech Ltd., Pazet, mean particle diameter: 20 to 40 nm) were mixed and stirred. The PEDOT-PSS aqueous solution containing the imidazole was then added to the resulting solution followed by stirring to obtain a conductive polymer solution D.

A conductive coating film was then formed by coating a conductive polymer solution D with polyethylene terephthalate film (manufactured by Toray U-34, thickness; 188 μm, light transmission; 92%, haze value; 0.7%) by a reverse coater, followed by drying the conductive coating film with hot air at 120 degrees Celsius for 2 minutes. The conductive coating film was then evaluated in the same manner as Example 1. The evaluation results are shown in Table 1.

Example 5

0.5 g of silver carbonate were added to 600 g of the PEDOT-PSS aqueous solution obtained in Production Example 2 followed by stirring to prepare a PEDOT-PSS aqueous solution containing silver carbonate.

Separate from the above, 2.5 g of 3-ethyl-3{[(3-ethyloxetane-3-yl)methoxy]methyl}oxetane) (manufactured by TOAGOSEI OXT221) (34.7% by mass of 3-ethyl-3{[(3-ethyloxetane-3-yl)methoxy]methyl}oxetane) based on a value of 100% by mass for the total amount of π-conjugated conductive polymer and polyanion), 1.8 g of methyl garlic acid, 20 g of 2-hydroxylacrylamide, 0.064 g of Sanaid SI-110L (manufactured by Sanshin Chemical Industry Co., Ltd.), and 800 g of ethanol were mixed and stirred. The PEDOT-PSS aqueous solution containing the silver carbonate was then added to the resulting solution followed by stirring to obtain a conductive polymer solution E.

A conductive coating film was then formed by coating a conductive polymer solution E with polyethylene terephthalate film (manufactured by Toray Industries, Inc. U-34, thickness; 188 μm) by a reverse coater, followed by drying the conductive coating film with hot air at 120 degrees Celsius for 2 minutes. Then, the conductive coating film was evaluated in the same manner as Example 1. The evaluation results are shown in Table 1.

Example 6

0.3 g of sodium dodecylbenzene sulphonate, 0.03 g of single layer carbon nanotube SWCNT (manufactured by Nikkiso Co., Ltd.) and 60 g of ion exchange water were mixed, and the resulting mixture was sonicated to obtain 0.05% by mass of carbon nanotube dispersion liquid.

27.0 g of the carbon nanotube dispersion liquid (converted to solid amount) were added to 600 g of the PEDOT-PSS aqueous solution obtained in Production Example 2 followed by stirring to prepare a PEDOT-PSS aqueous solution containing the carbon nanotube.

Separate from the above, 1.0 g of xylene bisoxetane (manufactured by TOAGOSEI OXT121) (13.9% by mass of xyxlene bisoxetane based on a value of 100% by mass for the total amount of π-conjugated conductive polymer and polyanion), 1.8 g of 2,3,3',4,4', 5-hexahydroxybenzophenone, 20 g of 2-hydroxyethylacrylamide, 1.0 g of adipic acid, and 800 g of ethanol were mixed and stirred. The PEDOT-PSS aqueous solution containing the carbon nanotube was then added to the resulting solution followed by stirring to obtain a conductive polymer solution F.

A conductive coating film was then formed by coating a conductive polymer solution F with polyethylene terephthalate film (manufactured by Toray Industries, Inc. U-426, thickness: 188 μm, light transmission: 93%, haze value: 0.4%) by a reverse coater, followed by drying the conductive coating film with hot air at 120 degrees Celsius for 2 minutes.

Comparative Example 1

A conductive coating film was formed and evaluated in the same manner as Example 1 except adding 0.04 g of 4,4'-(3-ethyloxetane-3-ylmethyloxymethyl)biphenyl (0.6% by mass of 4,4'-3-ethyloxetane-3-ylmethyloxymethyl)biphenyl based on a value of 100% by mass for the total amount of π-conjugated conductive polymer and polyanion). The evaluation results are shown in Table 1.

Comparative Example 2

A conductive coating film was formed and evaluated in the same manner as Example 2 except adding 40.0 g of 3-ethyl-3{[(3-ethyloxetane-3-yl)methoxy]methyl}oxetane (555.6% by mass of 3-ethyl-3{[(3-ethyloxetane-3-yl)methoxy]methyl}oxetane based on a value of 100% by mass for the total amount of π-conjugated conductive polymer and polyanion). The evaluation results are shown in Table 1.

The conductive coating films of Examples 1 to 6 that were formed from the conductive polymer solution containing oxetane compounds in the range of 1 to 500% by mass based on a value of 100% by mass for the total amount of π-conjugated conductive polymer and polyanion were excellent in water resistance and solvent resistance. Furthermore, the conductive coating films of Examples 1 to 6 were excellent in surface resistance, transparency, and contact resistance to ITO film, and suitable for touch panel.

The conductive coating film formed from the conductive polymer solution of Comparative Example 1 which the amount of oxetane compound is less than 1% by mass was poor in water resistance and solvent resistance.

The coating film formed from the conductive polymer solution of Comparative Example 2 which the amount of oxetane compound exceeds 500% by mass was low in conductivity, and the coating film was not able to be used as a conductive coating film.

INDUSTRIAL APPLICABILITY

The present invention provides a conductive polymer solution capable of forming a conductive coating film having both superior preservation stability and water resistance. In addition, the present invention is able to provide an input device which is excellent in water resistance.

BRIEF DESCRIPTION OF THE REFERENCE SYMBOLS

1 Input device
10 Movable electrode sheet
11 First transparent base
12 First transparent conductive coating film
20 Stationary electrode sheet
21 Second transparent base
22 Second transparent conductive coating film
30 Dot spacer

The invention claimed is:

1. A conductive polymer solution, comprising:
   a π-conjugated conductive polymer,
   a polyanion,
   a compound having an oxetane ring, and
   a solvent;
   wherein,
   the π-conjugated conductive polymer is poly(3,4-ethylenedioxythiophene), the compound having an oxetane ring is one selected from xylenebisoxetane, 3-ethyl-3{[3-ethyloxetane-3-yl)methoxy]methyl}oxetane, and 4,4'-(3-ethyloxetane-3-ylmethyloxymethyl)biphenyl, and
   the amount of the compound having an oxetane ring is within the range of 1 to 500% by mass based on a value of 100% by mass for the total amount of the p-conjugated conductive polymer and the polyanion.

2. The conductive polymer solution according to claim 1, comprising a compound having a carboxy group.

3. The conductive polymer solution according to claim 1, which comprises a cation forming compound which generates a Lewis acid.

4. The conductive polymer solution according to claim 1, comprising a conductive compound.

5. The conductive polymer solution according to claim 1, comprising at least one type of highly conductive agents selected from the group consisting of an aromatic ring compound having nitrogen, a compound having two or more of hydroxy group, a compound having two or more of carboxy group, a compound having one or more hydroxy groups and one or more of a carboxy group, a compound having an amide group, a compound having imide group, a lactam compound, a compound having glycidyl group, a silane coupling agent and a water-soluble organic solvent.

6. A conductive coating film, which is formed by coating the conductive polymer solution according to claim 1.

7. An input device comprising the conductive coating film according to claim 6.

8. The conductive polymer solution according to claim 1, wherein the amount of the compound having oxetane ring is within the range of 10 to 400% by mass based on a value of 100% by mass for the total amount of the p-conjugated conductive polymer and the polyanion.

9. The conductive polymer solution according to claim 1, further comprising: a hardening agent for oxetane compounds.

10. The conductive polymer solution according to claim 1, wherein the compound having an oxetane ring further comprises at least one of: compounds having an oxetane ring of 2 functional compounds selected from the group consisting of 1,4-bis{[(3-ethyl-3-oxetanyl)methoxy]methyl}benzene, di{1-ethyl(3-oxetanyl)}methyl ether, 1,6-bis{(3-ethyl-3-oxetanyl)methoxy}hexane, 9,9-bis{2-methyl-4-[2-(3-oxetanyl)]butoxyphenyl}fluorene, 9,9-bis{4-{2-[2-(3-oxetanyl)]butoxy}ethoxyphenyl}fluorine; multifunctional oxetane compounds selected from the group consisting of oxetane novolac resin; and compounds having an oxetane ring of 1 functional compound selected from the group consisting of 3-ethyl-3-(hydroxymethyl)oxetane, 3-ethyl-3-(2-ethylhexoxymethyl)oxetane, 3-ethyl-3-phenoxymethyloxetane, 3-(methacryloyloxymethyl)oxetane, and 3-(methacryloyloxymethyl)-2-phenyloxeatane.

* * * * *

UNITED STATES PATENT AND TRADEMARK OFFICE
CERTIFICATE OF CORRECTION

PATENT NO. : 8,728,351 B2  Page 1 of 1
APPLICATION NO. : 13/119770
DATED : May 20, 2014
INVENTOR(S) : Masahiro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this
Twenty-ninth Day of September, 2015

Michelle K. Lee
*Director of the United States Patent and Trademark Office*